US009986555B2

(12) United States Patent
Fang et al.

(10) Patent No.: US 9,986,555 B2
(45) Date of Patent: May 29, 2018

(54) SYSTEM INFORMATION TRANSMITTING AND RECEIVING METHOD AND DEVICE

(71) Applicant: ZTE CORPORATION, Shenzhen, Guangdong Province (CN)

(72) Inventors: Huiying Fang, Shenzhen (CN); Bo Dai, Shenzhen (CN); Shuqiang Xia, Shenzhen (CN); Jing Shi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 86 days.

(21) Appl. No.: 15/032,632

(22) PCT Filed: May 23, 2014

(86) PCT No.: PCT/CN2014/078293
§ 371 (c)(1),
(2) Date: Apr. 28, 2016

(87) PCT Pub. No.: WO2014/183697
PCT Pub. Date: Nov. 20, 2014

(65) Prior Publication Data
US 2016/0270043 A1    Sep. 15, 2016

(30) Foreign Application Priority Data
Oct. 31, 2013  (CN) .......................... 2013 1 0533830

(51) Int. Cl.
*H04W 4/00*   (2018.01)
*H04W 72/04*  (2009.01)
(Continued)

(52) U.S. Cl.
CPC ......... *H04W 72/044* (2013.01); *H04L 5/0091* (2013.01); *H04W 16/10* (2013.01); *H04W 48/12* (2013.01)

(58) Field of Classification Search
CPC ... H04W 72/044; H04W 16/10; H04W 48/12; H04W 72/0446; H04W 72/0453; H04L 5/0091
See application file for complete search history.

(56) References Cited

U.S. PATENT DOCUMENTS

2009/0122578 A1   5/2009  Beltran
2010/0227611 A1*  9/2010  Schmidt .................. H04W 4/06
                                                                    455/434
(Continued)

FOREIGN PATENT DOCUMENTS

CN         1434560 A      8/2003
CN       101350557 A      1/2009
(Continued)

*Primary Examiner* — Kevin Mew
(74) *Attorney, Agent, or Firm* — Ling Wu; Stephan Yang; Ling and Yang Intellectual Property

(57) ABSTRACT

Disclosed is a system information transmitting method, including: in one modification period, determining a frequency domain location for transmitting a coverage enhancement system message and time domain locations for periodically transmitting a coverage enhancement system message; a base station periodically transmitting the coverage enhancement system message; and the determined frequency domain location and the time domain locations for periodically transmitting are different from the re-transmission locations of main information block (MIB) information. Also disclosed are a receiving method corresponding to the transmitting method, as well as devices corresponding to the transmitting and receiving methods. The method and device of the embodiment of the present document is used to determine the time domain and frequency domain locations of the system message, thus avoiding the problem that an LTE network can't be accessed due to an address conflict caused by periodically transmitting system information for a plurality of times.

12 Claims, 7 Drawing Sheets

(51) Int. Cl.
*H04W 48/12* (2009.01)
*H04L 5/00* (2006.01)
*H04W 16/10* (2009.01)

(56) References Cited

U.S. PATENT DOCUMENTS

| | | | | |
|---|---|---|---|---|
| 2011/0002258 | A1* | 1/2011 | Du | H04B 7/2656 370/315 |
| 2011/0025289 | A1 | 2/2011 | Wang et al. | |
| 2011/0261747 | A1* | 10/2011 | Wang | H04B 7/155 370/315 |
| 2012/0236776 | A1* | 9/2012 | Zhang | H04W 48/12 370/312 |
| 2012/0238208 | A1* | 9/2012 | Bienas | H04W 8/24 455/41.2 |
| 2013/0044651 | A1* | 2/2013 | Wang | H04W 72/0406 370/280 |
| 2013/0163534 | A1* | 6/2013 | Anderson | H04L 1/0026 370/329 |
| 2014/0098761 | A1* | 4/2014 | Lee | H04W 74/006 370/329 |
| 2014/0301305 | A1* | 10/2014 | Xu | H04L 5/0053 370/329 |
| 2015/0017977 | A1* | 1/2015 | Ratasuk | H04W 88/10 455/426.1 |
| 2016/0095074 | A1* | 3/2016 | Park | H04W 8/005 370/350 |
| 2016/0212664 | A1* | 7/2016 | Uemura | H04W 24/08 |
| 2017/0156154 | A1* | 6/2017 | Deparis | H04W 72/1215 |
| 2017/0164419 | A1* | 6/2017 | Kim | H04W 76/028 |

FOREIGN PATENT DOCUMENTS

| | | |
|---|---|---|
| CN | 101621778 A | 1/2010 |
| CN | 101814827 A | 8/2010 |
| CN | 102131276 A | 7/2011 |
| JP | 2007274852 | 10/2007 |

* cited by examiner

SYSTEM INFORMATION TRANSMITTING AND RECEIVING METHOD AND DEVICE

TECHNICAL FIELD

The present document relates to the field of communications, and more particularly, to a system information transmitting and receiving method and device.

BACKGROUND OF THE RELATED ART

Mobile Testing Center (MTC) User Equipment (UE), also known as M2M (Machine-To-Machine) user communication device, is the main application form of the Internet of things in the current stage. Low power consumption and low cost of the MTC are guarantees for its large scale applications. As one of the most typical applications of the MTC device, the smart metering devices, as MTC devices, are typically installed in environments with low coverage performance (such as basement). In order to ensure that this kind of MTC devices can normally communicate with the base station system, it is often required to deploy additional devices such as stations and relays, which will greatly increase the deployment costs of operators. In the 3rd Generation Partnership Project (3GPP) Radio Access Network (RAN) technology proposal, Vodafone and other companies proposed the needs of improving the smart metering MTC device coverage without deploying additional devices in the RP-121282.

The smart metering MTC devices are mainly used to transmit small packet data, and are able to tolerate relatively large data transmission delay. In order to achieve the requirements of the RP-121282 technology proposal, lower modulation and coding rate and a plurality of re-transmissions in the time domain can be used to implement.

Currently, system information in the LTE system includes: main system information block (MIB) and a plurality of system information blocks (SIBs), FIG. 1 is a flow chart of transmitting system information in the LTE system in the related art, and FIG. 1 shows the process of the base station transmitting the MIB and the SIBs to the terminal. For SIBs other than the SIB1 in the SIBn, the message transmission is achieved through the system information (SI) configured in the scheduling information list in the SIB1. The SIB1 configures lengths of system message windows and transmission periods of various system messages, the lengths of the system message windows of all the system messages are the same and configurable. The SIBs messages are provided and transmitted in the downlink data channel, and the terminal obtains detailed time and frequency domain information transmitted by the SIBs by decoding the downlink control channel. A plurality of transmissions can be performed in one modification period by scheduling the system information. FIG. 2 is a schematic diagram of transmitting the SIB1 system information when the scheduling period is 80 ms, as shown in FIG. 2, re-transmission of the SIB1 is repeated for four times in the subframe 5 of even-numbered radio frames in 80 ms. Therefore, if control signaling such as the MTC resource allocation and data information can be scheduled for a sufficient number of times in the time domain, the MTC data information re-transmission can be achieved. Therefore, the plurality of transmissions of system information can be used to solve the problem of transmission performance in environments with MTC low coverage.

However, the SIBs need to be periodically scheduled and transmitted, and it is required to have corresponding downlink control channel instructions of the SIBs carried in the downlink data channel. The re-transmission techniques suitable for normal control signaling or data transmission cause conflicts in the time or frequency domain addresses of system messages, resulting in that the MTC terminal cannot normally access the LTE network. In environments with low coverage, traditional terminal devices including the abovementioned MTC terminal have the problem of being unable to properly access the LTE network, and ensuring that the traditional terminal devices can communicate properly with the LTE network is a problem to be solved urgently.

SUMMARY

To solve the abovementioned technical problem, the present document discloses a system information transmitting and receiving method and system, to realize a normal transmission of MTC terminal system information in the LTE network.

In order to achieve the purposes of the present application, the present document provides a system information transmitting method, including:

in one modification period, determining a frequency domain location for transmitting a coverage enhancement system message and time domain locations for periodically transmitting a coverage enhancement system message; a base station periodically transmitting the coverage enhancement system messages; wherein the determined frequency domain location and time domain locations for periodically transmitting are different from re-transmission locations of main system information block (MIB) information.

Preferably, the coverage enhancement system message is: a system message including all system information required by an access system.

Preferably, the coverage enhancement system message is: a system message including a system information block 1 (SIB1) and system information other than the SIB1 required by the access system.

Preferably, the coverage enhancement system message is: various system information blocks including system information required by the access system.

Preferably, the frequency domain location for transmitting the coverage enhancement system message is fixed.

Preferably, the method further includes: in one modification period, according to a level of a coverage enhancement requirement, selecting whether to additionally transmit at least one SIB1, when selecting to additionally transmit the SIB1, determining a period and time domain locations of the additionally transmitted SIB1.

Preferably, the SIB1 carries instruction information of whether to transmit the coverage enhancement system message.

Preferably, after determining the frequency domain location for transmitting the coverage enhancement system message and the time domain locations for periodically transmitting the coverage enhancement system message, the method further includes: determining a transmission period and time domain locations of one system message including the system information other than the SIB1 required by the access system through the SIB1.

Preferably, after determining the frequency domain location for transmitting the coverage enhancement system message and the time domain locations for periodically transmitting the coverage enhancement system message, the method further includes: needing to additionally determine a transmission period and time domain locations of each transmitted system information block, wherein the transmission period of each system information block may be set to be the same or different.

Preferably, the transmission period is inversely proportional to the level of the coverage enhancement requirement.

Preferably, the level of the coverage enhancement requirement includes: a signal strength of 15~20 dB being a high level; a signal strength of 10~14 dB being a medium level; and a signal strength of 5~9 dB being a low level.

Preferably, the level of the coverage enhancement requirement includes: a signal strength of 15~20 dB being a high level; a signal strength of 10~14 dB being a medium level; and a signal strength of 5~9 dB being a low level.

On the other hand, the present document further includes a system information receiving method, including:

in one modification period, determining a frequency domain location for receiving a coverage enhancement system message and time domain locations for periodically receiving a coverage enhancement system message; a terminal periodically receiving the coverage enhancement system messages; wherein the determined frequency domain location and the time domain locations for periodically receiving are different from re-reception locations of main system information block (MIB) information.

Preferably, the coverage enhancement system message is: a system message including all system information required by an access system.

Preferably, the coverage enhancement system message is: a system message including a system information block 1 (SIB1) and system information other than the SIB1 required by the access system.

Preferably, the coverage enhancement system message is: various system information blocks including system information required by the access system.

Preferably, the frequency domain location for receiving the coverage enhancement system message is fixed.

Preferably, the method further includes: in one modification period, according to a level of a coverage enhancement requirement, selecting whether to additionally receive at least one SIB1, when selecting to additionally receive the SIB1, determining a period and time domain locations of the additionally received SIB1.

Preferably, the SIB1 carries instruction information of whether to receive the coverage enhancement system message.

Preferably, after determining the frequency domain location for receiving the coverage enhancement system message and the time domain locations for periodically receiving the coverage enhancement system message, the method further includes: determining a reception period and time domain locations of one system message including the system information other than the SIB1 required by the access system through the SIB1.

Preferably, after determining the frequency domain location for receiving the coverage enhancement system message and the time domain locations for periodically receiving the coverage enhancement system message, the method further includes: needing to additionally determine a reception period and time domain locations of each received system information block, wherein the reception period of each system information block may be set to be the same or different.

Preferably, the reception period is inversely proportional to the level of the coverage enhancement requirement.

Preferably, the level of the coverage enhancement requirement includes: a signal strength of 15~20 dB being a high level; a signal strength of 10~14 dB being a medium level; and a signal strength of 5~9 dB being a low level.

Preferably, the level of the coverage enhancement requirement includes: a signal strength of 15~20 dB being a high level; a signal strength of 10~14 dB being a medium level; and a signal strength of 5~9 dB being a low level.

In still another aspect, the present document further includes a system information transmitting device, provided within a base station, and characterized in including:

a setting unit, configured to: set a frequency domain location for transmitting a coverage enhancement system message and time domain locations for periodically transmitting a coverage enhancement system message;

a transmitting unit, configured to: periodically transmit the coverage enhancement system message;

wherein, the set frequency domain location and the time domain locations for periodically transmitting are different from re-transmission locations of main system information block (MIB) information.

Preferably, the coverage enhancement system message is: a system message including system information required by an access system.

Preferably, the coverage enhancement system message is: a system message including a system information block 1 (SIB1) and system information other than the SIB1 required by the access system.

Preferably, the coverage enhancement system message is: various system information blocks including system information required by the access system.

Preferably, the frequency domain location for transmitting the coverage enhancement system message is fixed.

Preferably, the setting unit is further configured to: according to a level of a coverage enhancement requirement, select whether to additionally transmit at least one SIB1, when selecting to additionally transmit the SIB1, set a period and time domain locations of the additionally transmitted SIB1.

Preferably, the SIB1 carries instruction information of whether to transmit the coverage enhancement system message.

Preferably, the device is further configured to: after setting the frequency domain location for transmitting the coverage enhancement system message and the time domain locations for periodically transmitting the coverage enhancement system message, set a transmission period and time domain locations of one system message including system information other than the SIB1 required by the access system through the SIB1.

Preferably, the device is further configured to: after setting the frequency domain location for transmitting the coverage enhancement system message and the time domain locations for periodically transmitting the coverage enhancement system message, additionally set a transmission period and time domain locations of each transmitted system information block, wherein the transmission period of each system information block may be set to be the same or different.

Preferably, the transmission period is inversely proportional to the level of the coverage enhancement requirement.

Preferably, the level of the coverage enhancement requirement includes: a signal strength of 15~20 dB being a high level; a signal strength of 10~14 dB being a medium level; and a signal strength of 5~9 dB being a low level.

Preferably, the level of the coverage enhancement requirement includes: a signal strength of 15~20 dB being a high level; a signal strength of 10~14 dB being a medium level; and a signal strength of 5~9 dB being a low level.

In still another aspect, the present document further includes a system information receiving device, including: in one modification period:

a setting unit, configured to: set a frequency domain location for receiving a coverage enhancement system message and time domain locations for periodically receiving a coverage enhancement system message;

a receiving unit, configured to: make a terminal periodically receive the coverage enhancement system message;

wherein the set frequency domain location and the time domain locations for periodically receiving are different from re-reception locations of main system information block (MIB) information.

Preferably, the coverage enhancement system message is: a system message including system information required by an access system.

Preferably, the coverage enhancement system message is: a system message including a system information block 1 (SIB1) and system information other than the SIB1 required by the access system.

Preferably, the coverage enhancement system message is: various system information blocks including system information required by the access system.

Preferably, the frequency domain location for receiving the coverage enhancement system message is fixed.

Preferably, the setting unit is further configured to: according to a level of a coverage enhancement requirement, select whether to additionally receive at least one SIB1, when selecting to additionally receive the SIB1, set a period and time domain locations of the additionally received SIB1.

Preferably, the SIB1 carries instruction information of whether to receive the coverage enhancement system message.

Preferably, the device is further configured to: after setting the frequency domain location for receiving the coverage enhancement system message and the time domain locations for periodically receiving the coverage enhancement system message, set a reception period and time domain locations of one system message including the system information other than the SIB1 required by the access system through the SIB1.

Preferably, the device is further configured to: after setting the frequency domain location for receiving the coverage enhancement system message and the time domain locations for periodically receiving the coverage enhancement system message, additionally set a reception period and time domain locations of each received system information block, wherein the reception period of each system information block may be set to be the same or different.

Preferably, the reception period is inversely proportional to the level of the coverage enhancement requirement.

Preferably, the level of the coverage enhancement requirement includes: a signal strength of 15~20 dB being a high level; a signal strength of 10~14 dB being a medium level; and a signal strength of 5~9 dB being a low level.

Preferably, the level of the coverage enhancement requirement includes: a signal strength of 15~20 dB being a high level; a signal strength of 10~14 dB being a medium level; and a signal strength of 5~9 dB being a low level.

The technical solution of the present application provides a system information transmitting method, including: in one modification period, determining a frequency domain location for transmitting and time domain locations for periodically transmitting a coverage enhancement system message; a base station periodically transmitting the coverage enhancement system message; the determined frequency domain location and the time domain locations for periodically transmitting are different from re-transmission locations of main system information block (MIB) information. The method according to the embodiment of the present document can be used to determine the time domain and frequency domain locations of the system message, thus avoiding the problem that the LTE network cannot be accessed due to an address conflict caused by periodically transmitting the system message for a plurality of times.

BRIEF DESCRIPTION OF THE DRAWINGS

The accompanying drawings described herein are used to provide a further understanding of the present document, and constitute a part of the present application, exemplary embodiments of the present document and their descriptions are used to explain the present document, and do not constitute an improper limit on the present document. In the accompanying drawings.

PREFERRED EMBODIMENTS

Figure 1:
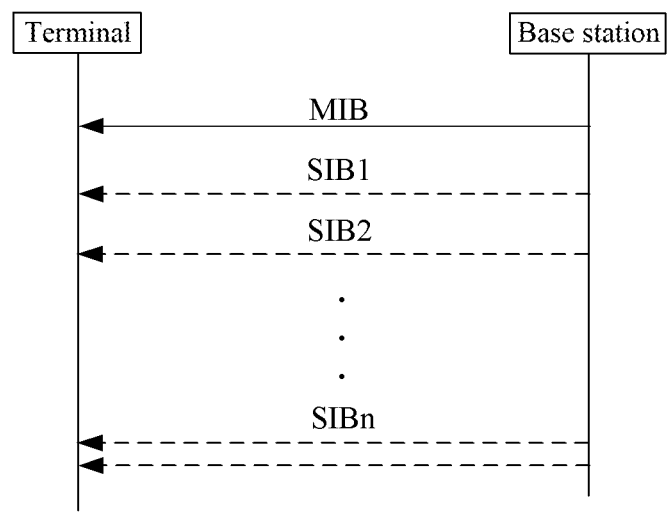
FIG. 1 is a flow chart of transmitting a system message in the LTE system in the related art.
Figure 2:
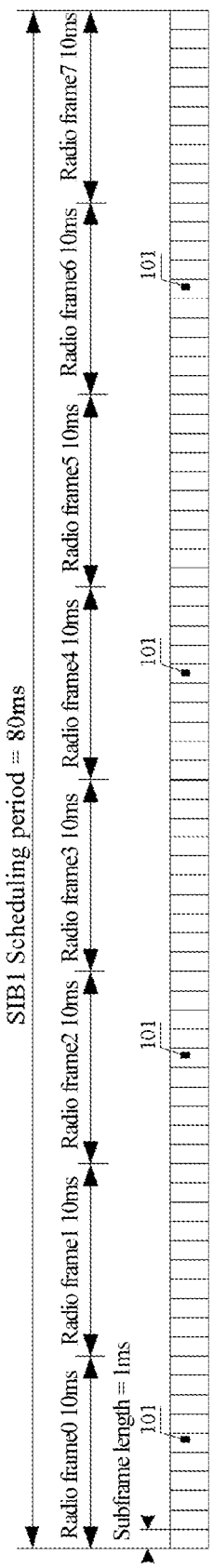
FIG. 2 is a schematic diagram of transmitting SIB1 system information when a scheduling period is 80 ms in the related art.
Figure 3:
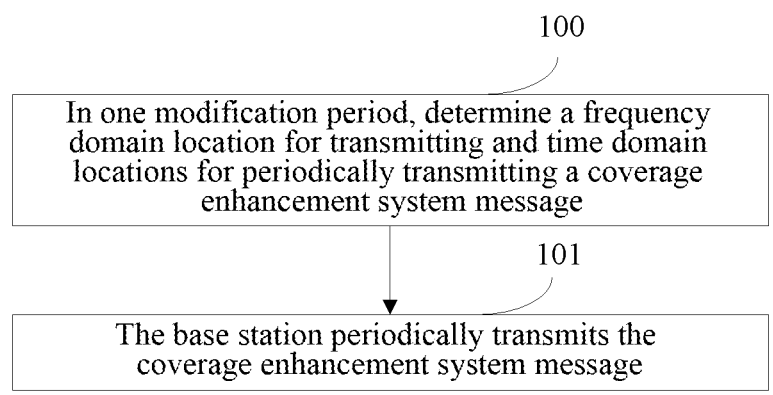
FIG. 3 is a flow chart of a system information transmitting method in accordance with an embodiment of the present document.

FIG. 3 is a flow chart of a system information transmitting method according to the present document, as shown in FIG. 3, the method of the present document includes:

in step 100, in one modification period, it is to determine a frequency domain location for transmitting a coverage enhancement system message and time domain locations for periodically transmitting a coverage enhancement system message; wherein, the determined frequency domain location and the time domain locations for periodically transmitting are different from re-transmission locations of main system information block (MIB) information. It should be noted that the MIB address location exists in a fixed message format, therefore, the problem of address conflict can be solved through calculation.

In the present step, the coverage enhancement system message is: in case a, a system message including system information required by an access system.

Or, in case b, a system message including a system information block 1 (SIB1) and the system information other than the SIB1 required by the access system. In one modification period, according to the coverage enhancement requirement, it is to select whether to additionally transmit at least one SIB1, when selecting to additionally transmit the SIB1, after determining frequency domain location and time domain locations for periodically transmitting, it is to further need to determine the period and time domain locations of the additionally transmitted SIB1 in the coverage enhancement system message. The SIB1 carries instruction information of whether to transmit the coverage enhancement system message. It is to determine the transmission period and the time domain locations of one system message including the system information other than the SIB1 required by the access system through the SIB1.

Or, in case c, various system information blocks including the system information required by the access system. In this case, the method of the present document also needs to set the transmission period and the time domain locations of each additionally transmitted system information block in the coverage enhancement system message, and the transmission period of each system information block can be set to be the same or different. It should be noted that each system information block herein and the system information block in the prior art have the same content.

If the abovementioned three kinds of coverage enhancement system messages include the SIB1, the SIB1 carries instruction information of whether to transmit the coverage enhancement system message.

The frequency domain location for transmitting the coverage enhancement system message is fixed.

The transmission period is inversely proportional to the level of the coverage enhancement requirement in the cases b and c. The level of the coverage enhancement requirement includes: the signal strength of 15~20 dB being a high level; the signal strength of 10~14 dB being a medium level; and the signal strength of 5~9 dB being a low level. Taking the high level for example, when the coverage enhancement requirement index is the high level, it illustrates that for the coverage enhancement system message, the transmission period of the system message needs to be reduced to achieve higher frequent transmission of the coverage enhancement system message in this environment, thus improving the working quality of the coverage enhancement system message.

It should be noted that the level of the coverage enhancement is: according to the actual environment, the range of the signal strength and the classification of the level are adjusted accordingly based on the actual situation, and its implementation process is set according to the actual situation, and its implementation way is an existing technology.

In step 101, the base station periodically transmits the coverage enhancement system message.

Figure 4:
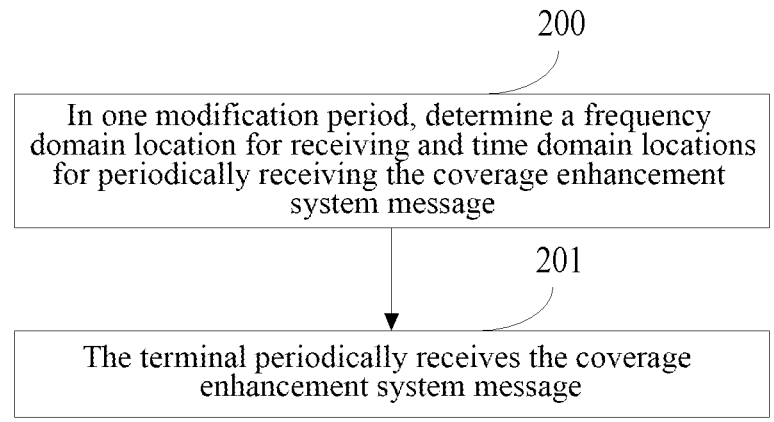
FIG. 4 is a flow chart of a system information receiving method in accordance with an embodiment of the present document.

FIG. 4 is a flow chart of a system information receiving method according to the present document, as shown in FIG. 4, the system information receiving method includes:

in step 200, in one modification period, it is to determine a frequency domain location for receiving a coverage enhancement system message and time domain locations for periodically receiving a coverage enhancement system message; wherein, the determined frequency domain location and the time domain locations for periodically receiving are different from re-reception locations of the main system information block (MIB) information. It should be noted that the MIB address location exists in a fixed message format, therefore, the problem of address conflict can be solved through calculation.

In the present step, the coverage enhancement system message is: in case a, a system message including all system information required by an access system.

Or, in case b, a system message including a system information block 1 (SIB1) and the system information other than the SIB1 required by the access system. In one modification period, according to the level of the coverage enhancement requirement, it is to select whether to additionally receive the SIB1, when selecting to additionally receive the SIB1, after the determined frequency domain location and the time domain locations of periodic reception, it is to further need the period and time domain locations of the additionally received SIB1 in the coverage enhancement system message. The SIB1 carries instruction information of whether to receive the coverage enhancement system message. It is to determine the reception period and the time domain locations of one system message including the system information other than the SIB1 required by the access system through the SIB1.

Or, in case c, various system information blocks including the system information required by the access system. In this case, the method of the present document also needs to set the transmission period and the time domain locations of each additionally-transmitted system message in the coverage enhancement system message, the reception period of each conventional system message can be set to be the same or different. It should be noted that each system information block herein and the system information block in the prior art have the same content.

If the abovementioned three kinds of coverage enhancement system messages include the SIB1, the SIB1 carries instruction information of whether to transmit the coverage enhancement system message.

The reception period is inversely proportional to the level of the coverage enhancement requirement in the cases b and c. The level of the coverage enhancement requirement includes: the signal strength of 15~20 dB being a high level; the signal strength of 10~14 dB being a medium level; and the signal strength of 5~9 dB being a low level.

Taking the high level for example, when the coverage enhancement requirement index is the high level, it indicates that for the coverage enhancement system message, the transmission period of the system message needs to be reduced to achieve higher frequent transmission of the coverage enhancement system message in this environment, thus improving the working quality of the coverage enhancement system message.

It should be noted that, for the level of the coverage enhancement, according to the actual environment, the range of the signal strength and the classification of the level are adjusted accordingly based on the actual situation, and its implementation process is set according to the actual situation and its implementation way is an existing technology.

The frequency domain location for receiving the coverage enhancement system message is fixed.

In step 201, the terminal periodically receives the coverage enhancement system message.

Figure 5:
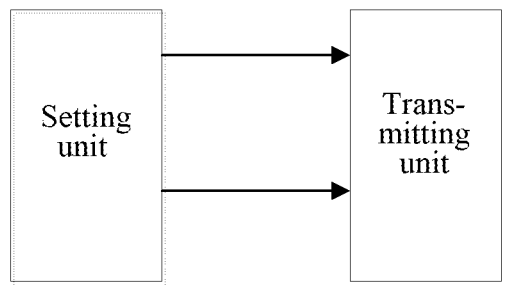
FIG. 5 is a schematic diagram of a system information transmitting device in accordance with an embodiment of the present document.

FIG. 5 is a schematic diagram of a system information transmitting device in accordance with an embodiment of the present document. As shown in FIG. 5, the system information transmitting device is provided within a base station and includes:

a setting unit, used to: set a frequency domain location for transmitting a coverage enhancement system message and time domain locations for periodically transmitting a coverage enhancement system message, wherein, the set frequency domain location and the time domain locations of periodic transmission are different from re-transmission locations of main system information block (MIB) information.

The coverage enhancement system message is: in case a, a system message including the system information required by an access system.

In case b, a system message including a system information block 1 (SIB1) and the system information other than the SIB1 required by the access system.

In the case b, the setting unit is further used to, according to the level of the coverage enhancement requirement, select whether to additionally transmit at least one SIB1, when selecting to additionally transmit the SIB1, set a period and time domain locations of the additionally transmitted SIB1. The SIB1 carries the instruction information of whether to transmit the coverage enhancement system message.

After setting the frequency domain location for transmitting the coverage enhancement system message and the time domain locations for periodically transmitting the coverage enhancement system message, it is to set the transmission period and the time domain locations of one system message including the system information other than the SIB1 required by the access system through the SIB1.

In case c, various system information blocks including the system information required by the access system.

Setting the frequency domain location for transmitting the coverage enhancement system message and the time domain locations for periodically transmitting the coverage enhancement system message needs to additionally set the transmission period and the time domain locations of each transmitted system information block, and the transmission period of each system information block can be set to be the same or different.

The frequency domain location for transmitting the coverage enhancement system message is fixed.

The transmission period is inversely proportional to the level of the coverage enhancement requirement. The level of the coverage enhancement requirement includes: the signal strength of 15~20 dB being a high level; the signal strength of 10~14 dB being a medium level; and the signal strength of 5~9 dB being a low level.

A transmitting unit, used to periodically transmit the coverage enhancement system message.

Figure 6:
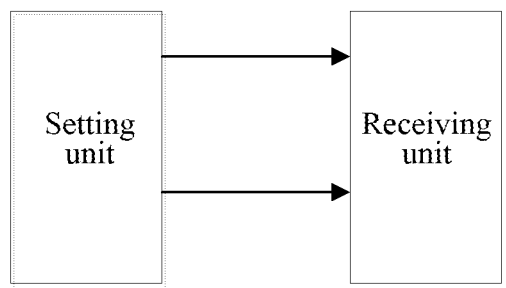
FIG. 6 is a schematic diagram embodiment of a system information receiving device in accordance with an embodiment of the present document.

FIG. 6 is a schematic diagram of the system information receiving device in accordance with an embodiment of the present document, as shown in FIG. 6, the system information receiving device includes:

a setting unit, used to set a frequency domain location for receiving a coverage enhancement system message and time domain locations for periodically receiving a coverage enhancement system message; the set frequency domain location and the time domain locations for periodically receiving are different from re-reception locations of main system information block (MIB) information.

The coverage enhancement system message is: in case a, a system message including system information required by an access system.

In case b, a system message including a system information block 1 (SIB1) and the system information other than the SIB1 required by the access system.

In the case b, the setting unit is further used to, according to the level of the coverage enhancement requirement, select whether to additionally receive at least one SIB1, when selecting to additionally receive the SIB1, set a period and time domain locations of the additionally received SIB1. The SIB1 carries the instruction information of whether to receive the coverage enhancement system message.

After setting the frequency domain location for receiving the coverage enhancement system message and the time domain locations for periodically receiving the coverage enhancement system message, it is to set the reception period and the time domain locations of one system message including the system information other than the SIB1 required by the access system through the SIB1.

In case c, various system information blocks including the system information required by the access system.

After setting the frequency domain location for receiving the coverage enhancement system message and the time domain locations for periodically receiving the coverage enhancement system message, it needs to additionally set the reception period and the time domain locations of each received system information block, and the reception period of each system information block can be set to be the same or different.

The frequency domain location for receiving the coverage enhancement system message is fixed.

The reception period is inversely proportional to the level of the coverage enhancement requirement. The level of the coverage enhancement requirement includes: the signal strength of 15~20 dB being a high level; the signal strength of 10~14 dB being a medium level; and the signal strength of 5~9 dB being a low level.

A receiving unit, used to periodically receive the coverage enhancement system message.

First Specific Embodiment

In the following, in conjunction with the method for transmitting a system message composed of system control information, the present document will be described in detail.

First, in one modification period, it is to determine the frequency domain location for transmitting the coverage enhancement system message and the time domain locations for periodically transmitting the coverage enhancement system message.

Figure 7:
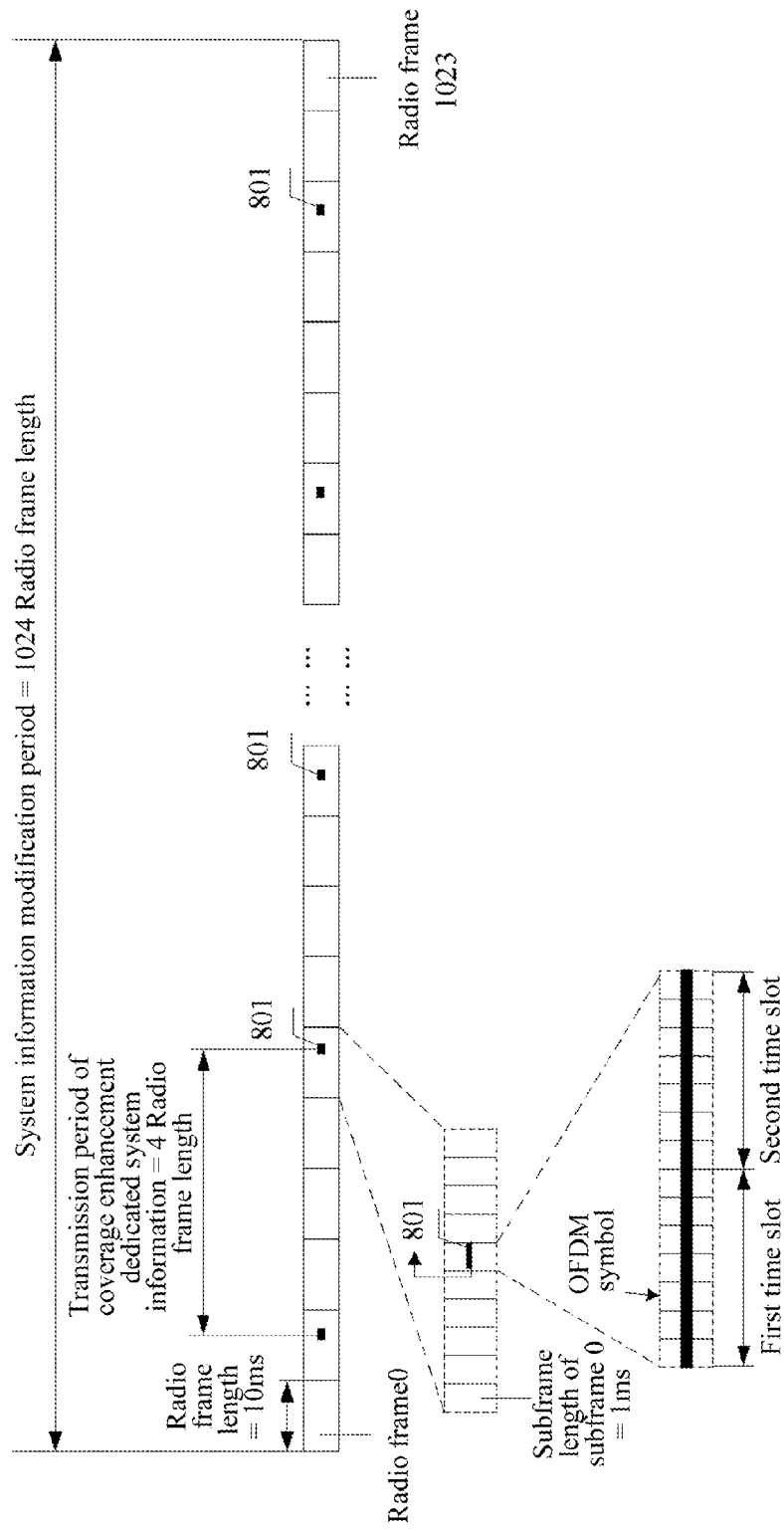
FIG. 7 is a structure diagram of determining time domain and frequency domain locations of a coverage enhancement system message in accordance with a first specific embodiment of the present document.

FIG. 7 is a structure diagram of determining time and frequency domain locations of the coverage enhancement system message in accordance with the first specific embodiment of the present document, FIG. 7 shows the frequency domain location for transmitting the coverage enhancement system message and the time domain locations for periodically transmitting the coverage enhancement system message.

The coverage enhancement system message is: a system message including the system information required by the access system. The determined frequency domain location and the time domain locations of periodic reception of the coverage enhancement system message are different from the re-reception locations of the MIB information. Its frequency domain location is fixed.

Secondly, the base station periodically transmits the coverage enhancement system message. The system message transmission would not have the address conflict by using the embodiments of the present document, so that the system message can be accessed to the LTE network.

Second Specific Embodiment

Figure 8:
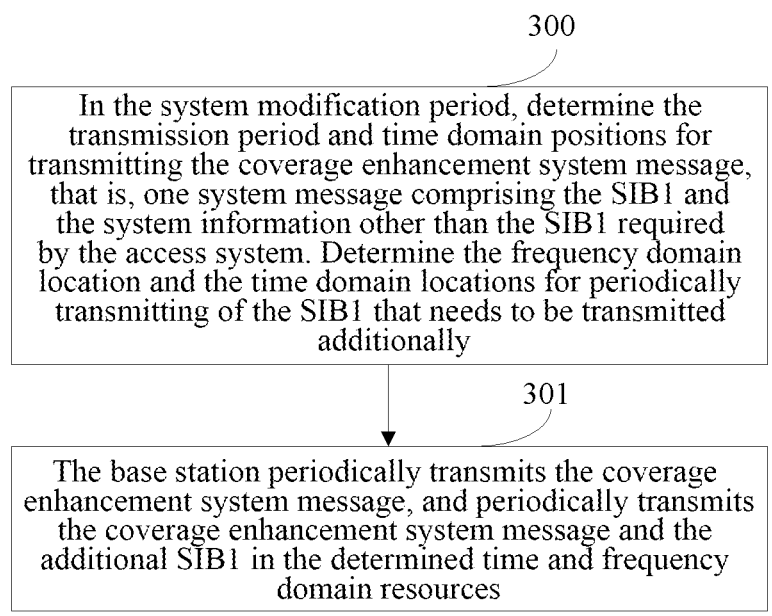
FIG. 8 is a flow chart of the system information transmitting method in accordance with a second specific embodiment of the present document.

FIG. 8 is a flow chart of the system information transmitting method in which the SIB1 is additionally transmitted in accordance with the specific second embodiment of the present document. As shown in FIG. 8, the coverage enhancement system message is a system message including the SIB1 and system information other than the SIB1 required by the access system, and it is to further select to additionally transmit one SIB1. The method includes:

in step 300, in the system modification period, it is to determine the frequency domain location for transmitting and the time domain locations for periodically transmitting the coverage enhancement system message, that is, one system message including the SIB1 and the system information other than the SIB1 required by the access system, and the frequency domain location is fixed. It is to determine the frequency domain location for transmitting and the time domain locations for periodically transmitting of the SIB1 that needs to be additionally transmitted in the coverage enhancement system message. The time and frequency domain locations of the coverage enhancement system message are different from the re-reception locations of the MIB information.

In this step, the transmission period of the coverage enhancement system message is determined depending on different levels of the coverage enhancement requirement. The higher the index of the coverage enhancement requirement, the smaller the transmission period. The determination of the transmission period of the additional transmitted SIB1 is the same as that of the coverage enhancement system message.

Moreover, the SIB1 carries the instruction information of whether to transmit the coverage enhancement system message.

In step 301, the base station periodically transmits the coverage enhancement system message, and periodically transmits the coverage enhancement system message and the additional SIB1 in the determined time and frequency domain resources.

Third Specific Embodiment

Figure 9:
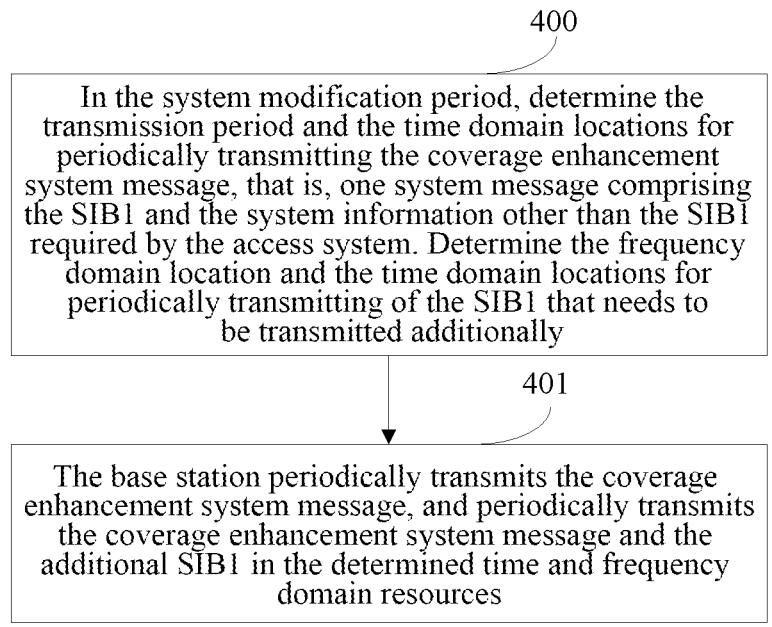
FIG. 9 is a flow chart of the system information transmitting method for additionally receiving the SIB1 in accordance with a third specific embodiment of the present document.

FIG. 9 is a flow chart of the system information transmitting method in which the SIB1 is transmitted additionally in the specific third embodiment of the present document. As shown in FIG. 9, the coverage enhancement system message is a system message including the SIB1 and the system information other than the SIB1 required by the access system, and it is to select to additionally transmit the SIB1. The method includes:

in step 400, in the system modification period, it is to determine the frequency domain location for transmitting and the time domain locations for periodically transmitting the coverage enhancement system message, that is, one system message including the SIB1 and the system information other than the SIB1 required by the access system, and the frequency domain location is fixed. It is to determine the frequency domain location for additionally transmitting the SIB1 and the time domain locations for periodically transmitting of the SIB1 that needs to be additionally transmitted in the coverage enhancement system message. The time and frequency domain locations of the coverage enhancement system message are different from the re-reception locations of the MIB information.

In this step, the transmission period of the coverage enhancement system message is determined depending on different levels of the coverage enhancement requirement. The higher the level of the coverage enhancement requirement, the smaller the transmission period. The determination of the transmission period of the additionally transmitted SIB1 is the same as that of the coverage enhancement system message.

Moreover, in this step, the coverage enhancement system message indicates the transmission period and the time domain locations of the coverage enhancement system message required by the access system other than the SIB1 through the SIB1.

In step 401, the base station periodically transmits the coverage enhancement system message, and periodically transmits the coverage enhancement system message and the additional SIB1 in the determined time and frequency domain resources.

Fourth Specific Embodiment

Figure 10:
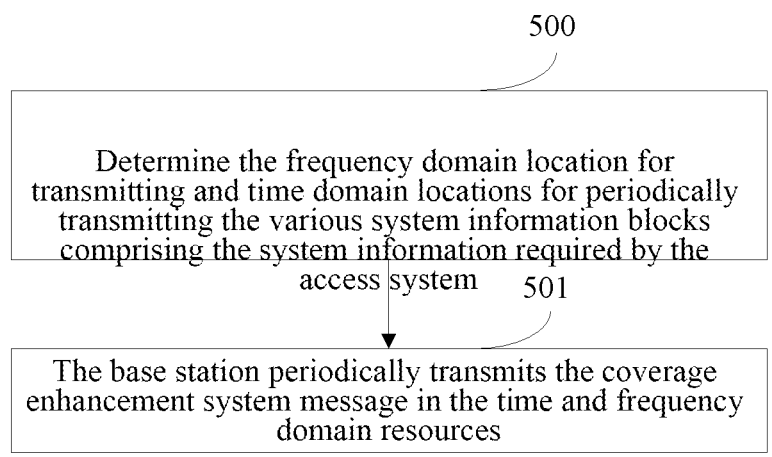
FIG. 10 is for transmitting a coverage enhancement system message which is various system information blocks of system information required by an access system in accordance with a fourth specific embodiment of the present document.

FIG. 10 is for transmitting the coverage enhancement system message which is various system information blocks that include the system information required by the access system in accordance with the fourth specific embodiment of the present document. As shown in FIG. 10, In step 500, it is to determine the frequency domain location for transmitting and time domain locations for periodically transmitting the various system information blocks including the system information required by the access system, and the frequency domain location is fixed. The time and frequency domain locations of the coverage enhancement system message are different from the re-reception locations of the MIB information.

It should be noted that, herein the system information blocks and the system information blocks in the related art have the same content.

In the present step, the transmission periods of the various system information blocks within the modification period may be the same or different. The time domain locations for the enhanced transmission of the different system information blocks should have no conflict.

The transmission period of the coverage enhancement system message is determined depending on different levels of the coverage enhancement requirement. The higher the level of the coverage enhancement requirement, the smaller the transmission period.

In step 501, the base station periodically transmits the coverage enhancement system message in the time and frequency domain resources.

In one modification period, by determining the frequency domain location for receiving and the time domain locations for periodically receiving the coverage enhancement system message, the terminal periodically receives the coverage enhancement system message. Because its implementation way has a corresponding relationship with the base station transmission way, it is not repeated here.

The above description is only preferred embodiments of the present document, and is not intended to limit the protection scope of the present document. Any modifications, equivalent substitutions and improvements made within the rule and principle of the present document should be included within the protection scope of the present document.

INDUSTRIAL APPLICABILITY

The method according to the embodiment of the present document can be used to determine the time domain and frequency domain locations of a system message, thus avoiding the problem that the LTE network cannot be accessed due to an address conflict caused by periodically transmitting the system message for a plurality of times.

What is claimed is:

1. A system information transmitting method, comprising:
in one modification period, determining a frequency domain location for transmitting a coverage enhancement system message and time domain locations for periodically transmitting a coverage enhancement system message;
a base station periodically transmitting the coverage enhancement system message;
wherein the determined frequency domain location and time domain locations for periodically transmitting are different from re-transmission locations of main system information block (MIB) information;
wherein,
the coverage enhancement system message is: a system message comprising a system information block 1 (SIB1) and system information other than the SIB1 required by the access system,
the method further comprises: in one modification period, according to a level of a coverage enhancement requirement, selecting whether to additionally transmit at least one system information block SIB1, when selecting to additionally transmit the SIB1, determining a period and time domain locations of the additionally transmitted SIB;
or,
the coverage enhancement system message is: various system information blocks comprising system information required by the access system,
after determining the frequency domain location for transmitting the coverage enhancement system message and the time domain locations for periodically transmitting the coverage enhancement system message, the method further comprises: needing to additionally determine a transmission period and time domain locations of each transmitted system information block, wherein the transmission period of each system information block may be set to be the same or different, and wherein the transmission period is inversely proportional to the level of the coverage enhancement requirement.

2. The method of claim 1, wherein, the frequency domain location for transmitting the coverage enhancement system message is fixed.

3. The method of claim 1, wherein, wherein the level of the coverage enhancement requirement comprises: a signal strength of 15~20 dB being a high level; a signal strength of 10~14 dB being a medium level; and a signal strength of 5~9 dB being a low level.

4. The method of claim 1, wherein, the SIB1 carries instruction information of whether to transmit the coverage enhancement system message.

5. The method of claim 1, wherein, after determining the frequency domain location for transmitting the coverage enhancement system message and the time domain locations for periodically transmitting the coverage enhancement system message, the method further comprises: determining a transmission period and time domain locations of one system message comprising the system information other than the SIB1 required by the access system through the SIB1, and wherein the transmission period is inversely proportional to the level of the coverage enhancement requirement, and the level of the coverage enhancement requirement comprises: a signal strength of 15~20 dB being a high level; a signal strength of 10~14 dB being a medium level; and a signal strength of 5~9 dB being a low level.

6. A system information receiving method, comprising:
in one modification period, determining a frequency domain location for receiving a coverage enhancement system message and time domain locations for periodically receiving a coverage enhancement system message;
a terminal periodically receiving the coverage enhancement system message;
wherein the determined frequency domain location and the time domain locations for periodically receiving are different from re-reception locations of main system information block (MIB) information;
wherein,
the coverage enhancement system message is: a system message comprising a system information block 1 (SIB1) and system information other than the SIB1 required by the access system,
the method further comprises: in one modification period, according to a level of a coverage enhancement requirement, selecting whether to additionally receive at least one SIB1, when selecting to additionally receive the SIB1, determining a period and time domain locations of the additionally received SIB1;
or,
the coverage enhancement system message is: various system information blocks comprising system information required by the access system,
after determining the frequency domain location for receiving the coverage enhancement system message and the time domain locations for periodically receiving the coverage enhancement system message, the method further comprises: needing to additionally determine a reception period and time domain locations of each received system information block, wherein the reception period of each system information block may be set to be the same or different, and wherein the reception period is inversely proportional to the level of the coverage enhancement requirement.

7. The method of claim 6, wherein, the frequency domain location for receiving the coverage enhancement system message is fixed.

8. The method of claim 6, wherein the level of the coverage enhancement requirement comprises: a signal strength of 15~20 dB being a high level; a signal strength of 10~14 dB being a medium level; and a signal strength of 5~9 dB being a low level.

9. The method of claim 6, wherein, the SIB1 carries instruction information of whether to receive the coverage enhancement system message.

10. The method of claim 6, wherein, after determining the frequency domain location for receiving the coverage enhancement system message and the time domain locations for periodically receiving the coverage enhancement system message, the method further comprises: determining a reception period and time domain locations of one system message comprising the system information other than the SIB1 required by the access system through the SIB1, and wherein, the reception period is inversely proportional to the level of the coverage enhancement requirement, and the level of the coverage enhancement requirement comprises: a signal strength of 15~20 dB being a high level; a signal strength of 10~14 dB being a medium level; and a signal strength of 5~9 dB being a low level.

11. A system information transmitting device, provided within a base station, and characterized in comprising hardware performing instructions stored in a non-transitory computer readable medium which executes steps in following modules:
   a setting unit, configured to: set a frequency domain location for transmitting a coverage enhancement system message and time domain locations for periodically transmitting a coverage enhancement system message;
   a transmitting unit, configured to: periodically transmit the coverage enhancement system message;
   wherein, the set frequency domain location and time domain locations for periodically transmitting are different from re-transmission locations of main system information block (MIB) information;
   wherein,
      the coverage enhancement system message is: a system message comprising a system information block 1 (SIB1) and system information other than the SIB1 required by the access system,
      the setting unit is further configured to: according to a level of a coverage enhancement requirement, select whether to additionally transmit at least one SIB1, when selecting to additionally transmit the SIB1, set a period and time domain locations of the additionally transmitted SIB1;
      or
      the coverage enhancement system message is: various system information blocks comprising system information required by the access system,
      after determining the frequency domain location for transmitting the coverage enhancement system message and the time domain locations for periodically transmitting the coverage enhancement system message, the setting unit is further configured to: need to additionally determine a transmission period and time domain locations of each transmitted system information block, wherein the transmission period of each system information block may be set to be the same or different, and wherein the transmission period is inversely proportional to the level of the coverage enhancement requirement.

12. A system information receiving device, comprising hardware performing instructions stored in a non-transitory computer readable medium which executes steps in following modules: a setting unit, a receiving unit wherein,
   in one modification period:
      the setting unit is configured to: set a frequency domain location for receiving a coverage enhancement system message and time domain locations for periodically receiving a coverage enhancement system message;
      the receiving unit is configured to: make a terminal periodically receive the coverage enhancement system message;
   wherein, the set frequency domain location and the time domain locations for periodically receiving are different from re-reception locations of main system information block (MIB) information;
   wherein,
      the coverage enhancement system message is: a system message comprising a system information block 1 (SIB1) and system information other than the SIB1 required by the access system,
      the setting unit is further configured to: according to a level of a coverage enhancement requirement, select whether to additionally receive at least one SIB1, when selecting to additionally receive the SIB1, set a period and time domain locations of the additionally received SIB1;
      or,
      the coverage enhancement system message is: various system information blocks comprising system information required by the access system,
      after determining the frequency domain location for receiving the coverage enhancement system message and the time domain locations for periodically receiving the coverage enhancement system message, the setting unit is further configured to: need to additionally determine a reception period and time domain locations of each received system information block, wherein the reception period of each system information block may be set to be the same or different, and wherein, the reception period is inversely proportional to the level of the coverage enhancement requirement.

* * * * *